INVENTOR:
HANS DONATH
BY Michael S. Striker
his ATTORNEY

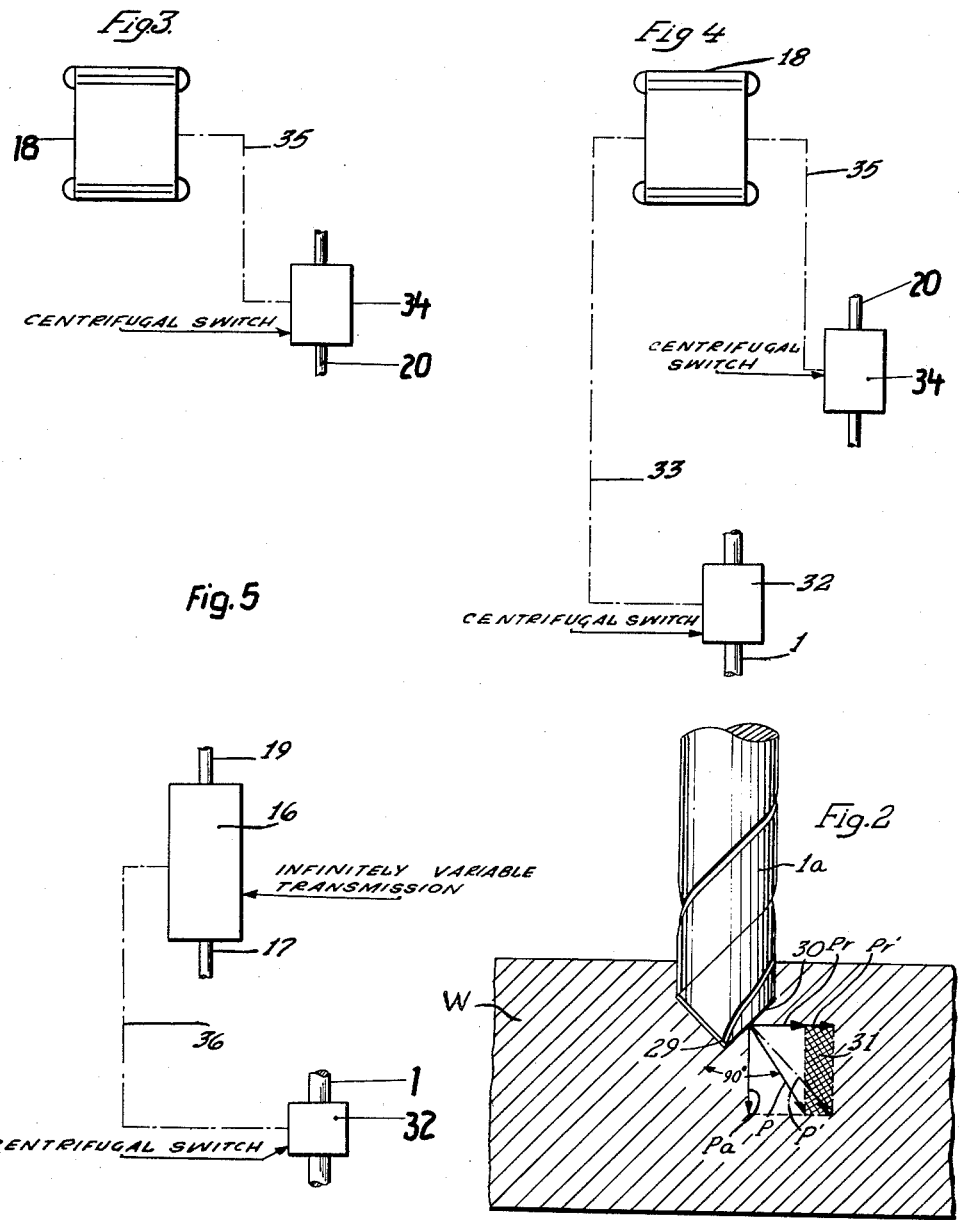

United States Patent Office 3,254,543
Patented June 7, 1966

3,254,543
AUTOMATIC REGULATOR FOR MACHINE TOOLS
AND THE LIKE
Hans Donath, Dresden, Germany, assignor to VEB
Flugzeugwerke Dresden, Dresden, Germany
Filed Mar. 16, 1961, Ser. No. 96,273
6 Claims. (Cl. 74—710)

The present invention relates to automatic regulators for machine tools and the like, and more particularly to a regulator which is capable of simultaneously and automatically controlling the rotational speed of the tool supporting means and the rate at which the tool is fed during engagement with the workpiece in a machine tool.

It is already known to provide a machine tool with a rigidly mounted power drive and to control the rotational speed as well as the rate of feed of a drill, of a rotary cutter or another rotary tool through a step-by-step transmission system or through an infinitely variable speed transmission assembly. In such machine tools, the rotational speed of the tool is controlled independently of the rate of feed and, therefore, the quality of work furnished by the machine tool is not uniform. For example, if the rotational speed of the tool is increased simultaneously with an increase in the rate of feed, the ratio of rotational speed to the rate of feed is changed unfavorably so that the machine is overloaded and begins to vibrate which, in turn, will cause the well known chatter. Such chatter is transmitted to the revolving tool as well as to the workpiece and results in inferior finish of the treated surface or surfaces owing to the formation of chatter marks.

It has been found that the chatter of machine tools is caused by the aforeemntioned vibrations on the one hand, and by improper application of the law of power distribution on the other hand. This is especially true in machine tools with a rigidly mounted power drive. As utilized in this description, the definition "law of power distribution" is intended to denote the principle that the power supplied to a machine tool by an electric motor or another source is divided into two components one of which is conveyed to the transmission which controls the rotation of the main spindle and the other of which is conveyed to the transmission which controls the tool feeding mechanism. The two components are reunited on the treated-surface of a workpiece, i.e., on the cutting surface of a rotary tool. This law of power distribution holds true for all shaving- or chip-producing machine tools including turning machines, milling machines, boring machines, grinding machines, rotary machine saws, and certain others.

An important object of the present invention is to provide an automatic regulator for machine tools which is constructed and assembled in such a way that the ratio of rotational speed to the rate of feed always remains at an optimum value.

Another important object of the invention is to provide a regulator of the just outlined characteristics which distributes the power supplied to a chip-producing machine tool in such a way as to simultaneously fulfill two conditions of equilibrium, namely, the sum of all forces and the sum of all rotational moments or speeds on the cutting surface of the tool must equal zero.

A further object of the instant invention is to provide an automatic regulator of the above described type which may be readily installed in all types of presently known chip-producing machine tools, which is of compact and lightweight design, which may be assembled of standard components, and which may be put to extensive use without requiring any supervision for its automatic operation.

An additional object of the invention is to provide an automatic regulator of the above outlined characteristics which is capable of automatically disconnecting or arresting the power source under certain unsatisfactory conditions of operation.

Still another object of the invention is to provide a regulator which automatically adjusts the rotational speed of the tool in response to changes in the consistency of a workpiece, which automatically adjusts the rotational speed of the tool in response to changes in the cross-sectional area of the chips, and which automatically responds to any mechanical changes in the tool, e.g., to increasing dullness of the cutting edge or edges.

With the above objects in view the invention resides in the provision of a regulator which includes a differential gear assembly one driven component of which is connected with the main spindle which supports the rotary tool and another driven component of which is connected with the tool feeding mechanism. Suitable transmission means may be interposed between the power source and the differential gear assembly to adjust the rotational speed of the main spindle independently of the regulator, and another transmission means may be interposed between the differential gear assembly and the feed mechanism to allow for adjustments in the rate of feed independently of the regulator. The differential gear assembly comprises a system of planet wheels and is adapted to automatically establish the conditions of equilibrium by varying the rotational speed of the spindle. In accordance with my invention, the condition of equilibrium is established in such a way that the automatic regulator adjusts itself to bring about a cutting action required by the configuration of the work contacting or cutting surface of a given tool.

The planet wheel system preferably comprises at least two sun wheels whose shafts are mounted in a planet carrier in the form of a rotary housing, and the latter is directly or indirectly connected with the main spindle. One of the sun wheels may constitute the first driven component of the differential gear assembly which may drive the feeding mechanism, and the rotary housing may constitute the second driven component which rotates the main spindle and the tool. This planet wheel system adjusts the rotary speed of the main spindle in dependency on the given moments and in dependency on the momentary working conditions, i.e., in dependency on the configuration and condition of the cutting edge, on the material of the workpiece, and on the rate of feed.

According to a more specific feature of the invention, the upper limit of the ratio of rotational speed to the rate of feed is controlled by a suitable control device. For example, the latter may assume the form of a centrifugal switch or a centrifugal governor which is operatively connected with the power source to either disconnect the power source or to arrest the same when the rotational speed or the rate of feed assumes an undesirable value, or when the rotational speed and the rate of feed attain a maximum permissible magnitude. To that end, the control device is mounted for rotation at a speed proportional with the speed of the first and/or second driven component of the differential gear assembly.

The novel features which are considered as characteristic for the invention are set forth in particular in the appended claims. The invention itself, however, both as to its construction and its method of operation, together with additional objects and advantages thereof, will be best understood from the following detailed description of certain specific embodiments when read in connection with the accompanying drawings, in which:

FIG. 2 is a section through a workpiece showing the distribution of forces when the drill is controlled by the improved regulator as well as if the drill is controlled by a device other than the regulator of FIG. 1;

FIG. 3 is a fragmentary schematic view of a modification;

FIG. 4 is a similar schematic view of a further modification; and

FIG. 5 is a schematic illustration of an additional modification.

Figure 1:
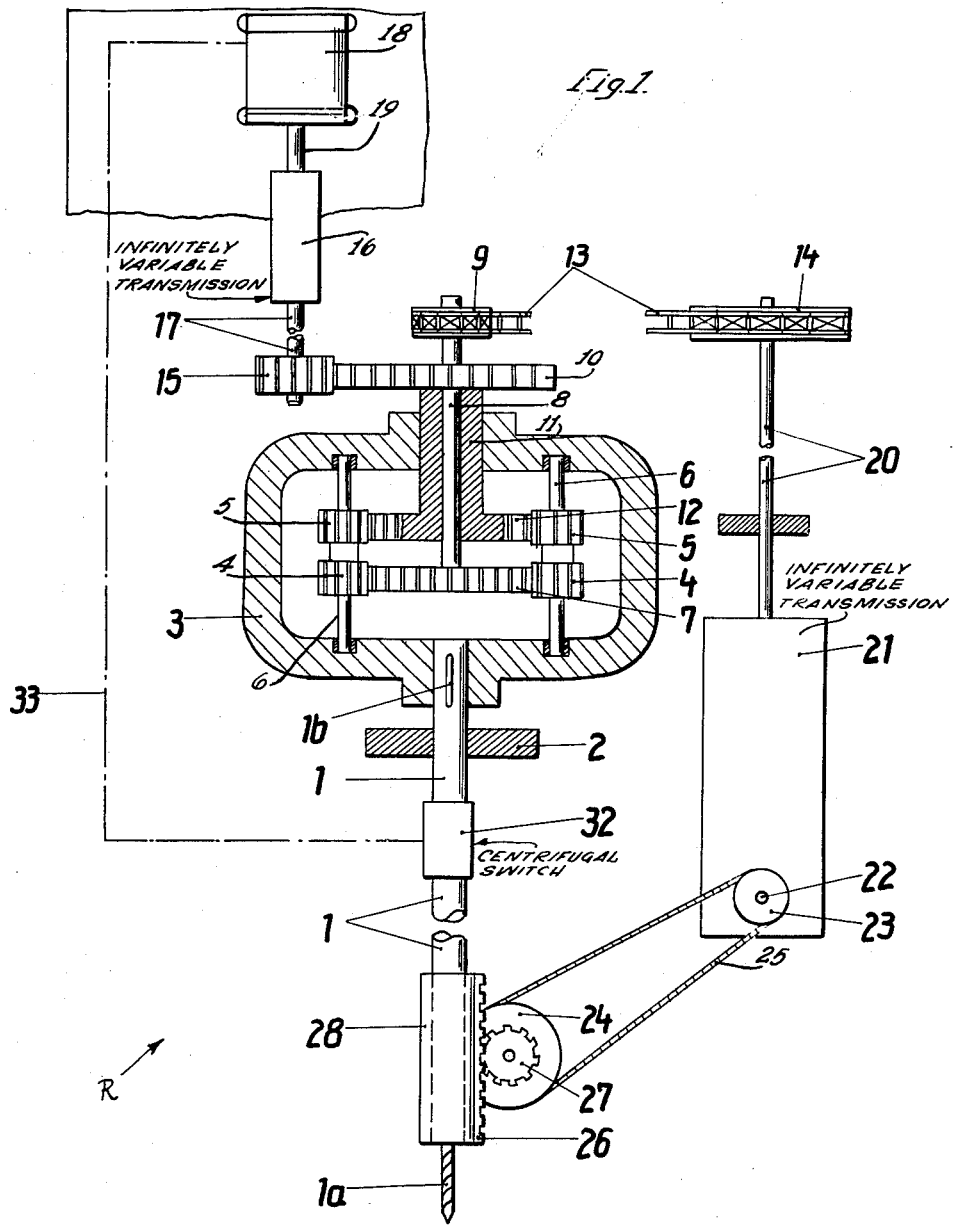
FIG. 1 is a schematic partly elevational and partly sectional view of an automatic regulator for the drill of a boring machine.

Referring now in greater detail to the drawings, and first to FIG. 1, there is shown an automatic regulator R which comprises a differential gear assembly D in the form of a two-stage planet wheel system whose wheels are mounted in a rotary housing or casing 3. The latter forms part of the planet wheel system D by constituting the planet wheel carrier and is coaxially connected to the rear end of a main spindle 1 which constitutes the rotary tool supporting means and supports at a point adjacent to its forward end a tool here shown as a coaxial drill 1a. The rigid connection between the housing 3 and the spindle 1 comprises a suitable key 1b or the like. The means for rotatably supporting the spindle 1 comprises an antifriction bearing 2. This bearing is supported by a non-illustrated part of the machine tool in which the regulator R is installed.

The two-stage planet wheel system further comprises two or more pairs of coaxial planet wheels 4, 5 whose common shafts 6 are rotatably received in suitable bearings provided in the housing 3. The planet wheels 4 mesh with a first sun wheel 7 which is rigidly secured to a shaft 8, and the latter is coaxially rotatable in the shaft 11 of a second sun wheel 12 which meshes with the planet wheels 5. The outwardly extending rear end of the shaft 8 carries a driver sprocket wheel 9 which drives an endless chain 13 mounted on a driven sprocket 14. Thus, the sprocket 14 may be rotated at a predetermined speed by the driven component or sun wheel 7 which latter, in turn, is driven by the second sun wheel 12 through the planet wheels 5 and 4. At the same time, the planet wheels 5 cause the other driven component or housing 3 of the differential gear assembly D to revolve with the main spindle 1 when the sun wheel 12 is rotated by a driving component of the assembly D in the form of a gear 10 which is coaxially mounted on and is secured to the outwardly extending rear end of the shaft 11. The gear 10 meshes with and is driven by a driver gear member 15 which is coaxially mounted on the output shaft 17 of a step-by-step or infinitely variable transmission 16, the latter being driven by an input shaft 19 which is the drive shaft of a power source here shown as an electric motor 18.

The driven sprocket 14 is coaxially connected to the input shaft 20 of a step-by-step or infinitely variable transmission 21 whose output shaft 22 rotates a driver sprocket 23. The sprocket 23 is adapted to rotate a driven sprocket 24 through an endless flexible element or chain 25, and the sprocket 24 is drivingly connected with a coaxial pinion 27 which meshes with a toothed rack 26. The latter is secured to a tool retaining sleeve 28 which is non-rotatably but axially shiftably connected to the main spindle 1 so that the tool 1a may be fed into contact with a workpiece and is simultaneously rotated by the main spindle 1. The rack 26 and the pinion 27 constitute the feeding mechanism for the tool 1a.

The regulator R operates as follows:

The motor 18 is started to rotate the driving component or gear 10 and the sun wheel 12 which latter drives the main spindle 1 and the drill 1a through the planet wheels 4, 5 and the rotary housing or driven component 3. The drill 1a then rotates at a given speed and, since it is assumed that the drill is still out of contact with a workpiece W (shown in FIG. 2), no pressure against its tip 29 exists and the force required for feeding the tool equals zero. When the tip 29 is brought into contact with the workpiece W, there develops a certain resistance against the advance of the tool 1a, and the rate of feed is adjusted accordingly, i.e. the rotational speed drops slightly in response to the resistance met by the tip 29. This is due to the fact that the condition of equilibrium (the sum of the forces required for rotation of the main spindle 1 and for feeding the tool 1a into the workpiece W equals the power delivered by the source 18) must be fulfilled at all times. When the tool 1a is withdrawn from the workpiece, the resistance met by the tip 29 drops to zero and the full power of the source 18 is now utilized for rotating the main spindle 1 at a higher rate of speed. Thus, the regulation of rotational speed and of the rate of feed occurs in a fully automatic way. It has been found that the regulator R operates with such precision that even a change in the sharpness of the cutting edge 30 brings about an automatic adjustment in the rate at which the main spindle 1 is driven. By varying the ratio of the variable speed transmission 16 and/or 21, one can obtain any desired rotational speed and any desired rate of feed.

FIG. 2 shows schematically the forces acting upon the workpiece W during a drilling operation with and without the regulator R of FIG. 1. The radial force component $Pr'$ and the axial force component $Pa$ should produce a resultant force P which is perpendicular to a plane passing through the cutting edge 30. However, as shown in FIG. 2, the components $Pr'$ and $Pa$ produce a resultant force $P'$ which is not perpendicular to the cutting edge 30. The cross-hatched area 31 indicates the losses resulting from the fact that the parallelogram of forces $Pr'$, $Pa$, $P'$ is not closed so that a certain amount of energy (represented by the area 31) remains to adversely affect the cutting operation. This remaining energy causes dullness of the cutting edge, vibrations of the tool, or a heating of the workpiece and of the tool.

If the tool 1a is driven by the regulator R, the resultant force P is always perpendicular to the cutting edge 30 and the parallelogram of forces $Pr$, $Pa$, $P$ is always closed so that no energy remains and no overheating, dulling or vibration will take place. The components $Pr$ and $Pa$ respectively symbolize the momentary cutting and feeding forces of the machine.

Referring back to FIG. 1, it will be seen that the regulator R comprises a control device in the form of a centrifugal governor or centrifugal switch which is schematically indicated by the reference numeral 32. This control device is operatively connected with the motor 18, as is indicated by the phantom line 33, and opens the circuit of the motor so that the motor is automatically disconnected from the source of electrical energy and is arrested when the rotational speed of the driver component 3 and of the main spindle 1 reaches a predetermined maximum value. As is shown in FIG. 3, a similar control device 34 may be mounted on the input shaft 20 of the transmission 21, and is then again connected with the motor 18 in the manner schematically indicated by the phantom line 35. This control device 34 is mounted for rotation at a speed proportional with the speed of the driven component 7. FIG. 4 shows that the regulator R may comprise two control devices 32 34 respectively mounted on the spindle 1 and on the input shaft 20.

The provision of one or more control devices is considered necessary because a regulator of the type shown in FIG. 1 could be adjusted to rotate the main spindle 1 and to drive the feeding mechanism 26, 27 at any desired rate of speed. However, in actual use of a machine tool, only certain rotary speeds are necessary and desirable; therefore, the control device 32 insures that the maximum rotational speed of the main spindle 1 is not exceeded. Thus, when the control device 32 arrests the motor 18, the operator knows that he must change the ratio of the transmission 16 in order to insure that the maximum permissible rotational speed is not reached or exceeded by the main spindle. Of course, the control device 32 may be connected to the transmission 16 to automatically change the ratio of this transmission when the main spindle 1 reaches a maximum permissible speed. This is indicated somewhat schematically by the phantom line 36 in FIG. 5 In the same manner, the governor 34 of FIG. 3 or 4 may be connected to the transmission 21, particularly if the latter is of the infinitely variable type.

According to a further modification of my invention, not shown in the drawings, the housing 3 may be mounted on a countershaft of the machine tool, and the main spindle is then driven by the housing either directly or through a system of suitable reducing gears.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An automatic regulator for simultaneously controlling the rotational speed and the rate of feed of tools in machine tools, said regulator comprising, in combination, a differential gear assembly consisting of a two-stage planet wheel system including a rotary housing, first and second sun wheel means coaxially received in said housing, first and second shaft means coaxially connected with said first and second sun wheel means, respectively, at least one pair of coaxially arranged planet wheels, said pair of planet wheels having a common shaft rotatably mounted in said housing, one of said pair of planet wheels meshing with said first sun wheel means and the other of said pair of planet wheels meshing with said second sun wheel means, and gear means coaxially connected with said first shaft means; a source of power drivingly connected with said gear means for rotating said first sun wheel means and for thereby rotating said second sun wheel means and said housing; a tool supporting spindle coaxially connected to and rotatable with said housing; tool feeding means; and a driving connection between said second shaft means and said tool feeding means, said planet wheel system operating in such a manner that the sum of forces respectively transmitted by said housing to said spindle and by said second shaft means to said tool feeding means equals the force transmitted by said source of power to said gear means, and that a reduction in force transmitted to said feeding means causes an increase in force transmitted to said spindle, or vice versa.

2. An automatic regulator for simultaneously controlling the rotational speed and the rate of feed of tools in machine tools, said regulator comprising, in combination, a differential gear assembly including a first and a second driven component and a driving component; electric motor means arranged to rotate said driven components through the intermediary of said driving component; tool supporting means operatively connected with and rotatable by said first driven component; tool feeding means operatively connected with and operable by said second driven component; and a control device mounted for rotation at a speed proportional with the speed of one of said driven components, said control device comprising a switch arranged to open the circuit of said motor means in response to a predetermined maximum rotational speed of said one driven component, said differential gear assembly operating in such a manner that the sum of forces respectively transmitted by said first and second driven components to said tool supporting means and to said tool feeding means equals the force transmitted by said motor means to said driving component, and that a reduction in force transmitted by one of said driven components causes an increase in force transmitted by the other driven component.

3. An automatic regulator for simultaneously controlling the rotational speed and the rate of feed of tools in machine tools, said regulator comprising, in combination, a differential gear assembly including a first and a second driven component and a driving component; electric motor means arranged to rotate said driven components through the intermediary of said driving component; tool supporting means operatively connected with and rotatable by said first driven component; tool feeding means operatively connected with and operable by said second driven component; and a first and a second control device respectively mounted for rotation at a speed proportional with the speed of said first and second driven components, each of said control devices comprising an electric switch arranged to open the circuit of said motor means in response to a predetermined maximum rotational speed of said first and second driving components, said differential gear assembly operating in such a manner that the sum of forces respectively transmitted by said first and second driven components to said tool supporting means and to said tool feeding means equals the force transmitted by said motor means to said driving component, and that a reduction in force transmitted by one of said driven components causes an increase in force transmitted by the other driven component.

4. An automatic regulator for simultaneously controlling the rotational speed and the rate of feed of tools in machine tools, said regulator comprising, in combination, a differential gear assembly consisting of a two-stage planet wheel system including a rotary housing, first and second sun wheel means coaxially received in said housing, first and second shaft means coaxially connected with said first and second sun wheel means, respectively, at least one pair of coaxially arranged planet wheels, said pair of planet wheels having a common shaft rotatably mounted in said housing, one of said pair of planet wheels meshing with said first sun wheel means and the other of said pair of planet wheels meshing with said second sun wheel means, and gear means coaxially connected with said first shaft means; an electric motor; a variable speed transmission having an input shaft connected with and driven by said motor, an output shaft, and a gear member mounted on said output shaft and meshing with said gear means for rotating said second sun wheel means and said housing through the intermediary of said first sun wheel means; a tool supporting spindle coaxially connected to and rotatable with said housing; tool feeding means; and a driving connection between said second shaft means and said tool feeding means, said planet wheel system operating in such a manner that the sum of forces respectively transmitted by said housing to said spindle and by said second shaft means to said tool feeding means equals the force transmitted by said source of power to said gear means, and that a reduction in force transmitted to said feeding means causes an increase in force transmitted to said spindle, or vice versa.

5. An automatic regulator for simultaneously controlling the rotational speed and the rate of feed of tools in machine tools, said regulator comprising, in combination, a differential gear assembly consisting of a two-stage planet wheel system including a rotary housing, first and second sun wheel means coaxially received in said housing, first and second shaft means coaxially connected with said first and second sun wheel means, respectively, at least one pair of coaxially arranged planet wheels, said pair of planet wheels having a common shaft rotatably mounted in said housing, one of said pair of planet wheels meshing with said first sun wheel means and the other of said pair of planet wheels meshing with said second sun wheel means, and gear means coaxially connected with said first shaft means; a source of power drivingly connected with said gear means for rotating said second sun wheel means and said housing through the intermediary of said first sun wheel means; a tool supporting spindle coaxially connected to and rotatable with said housing; tool feeding means comprising a tool retaining member connected for rotation with and axially shiftable along said spindle, a toothed rack connected with said tool retaining member, and a pinion meshing with said rack; a variable speed transmission having an input shaft and an output shaft; a first chain and sprocket drive provided between said second shaft means and said input shaft for operating said transmission; and a second chain and sprocket drive between said output shaft and said pinion for rotating the pinion and for thereby axially moving said tool retaining member, said planet wheel system operating in such a manner that the sum of forces respectively transmitted by said housing to said spindle and by said second shaft means to said tool feeding means equals the force transmitted by said source of power to said gear means, and that a reduction in force transmitted to said feeding means causes an increase in force transmitted to said spindle, or vice versa.

6. An automatic regulator for simultaneously controlling the rotational speed and the rate of feed of tools in machine tools, said regulator comprising, in combination, a differential gear assembly consisting of a two-stage planet wheel system including rotary planet carrier means, first and second sun wheel means coaxially mounted in said planet carrier means, first and second shaft means coaxially connected with said first and second sun wheel wheel means, respectively, at least one pair of coaxially arranged planet wheels, said pair of planet wheels having a common shaft rotatably mounted in said planet carrier means, one of said pair of planet wheels meshing with said first sun wheel means and the other of said pair of planet wheels meshing with said second sun wheel means, and gear means coaxially connected with said first shaft means; a source of power drivingly connected with said gears means for rotating said first sun wheel means and for thereby rotating said second sun wheel means and said planet carrier means; a tool supporting spindle coaxially connected to and rotatable with said planet carrier means; tool feeding means; and a driving connection between said second shaft means and said tool feeding means, said planet wheel system operating in such a manner than the sum of forces respectively transmitted by said planet carrier means to said spindle and by said second shaft means to said tool feeding means equals the force transmitted by said source of power to said gear means, and that a reduction in force transmitted to said feeding means causes an increase in force transmitted to said spindle, or vice versa.

References Cited by the Examiner

UNITED STATES PATENTS

| | | | |
|---|---|---|---|
| 1,055,545 | 3/1913 | Latimer | 74—714 |
| 1,074,906 | 10/1913 | Sosa | 77—34.2 |
| 1,175,892 | 3/1916 | Schoenky | 192—147 |
| 1,406,889 | 2/1922 | Pauley | 192—147 |
| 1,859,245 | 5/1932 | Remington | 74—714 |
| 2,144,307 | 1/1939 | Hallden | 74—740 |
| 2,203,743 | 6/1940 | Parsons | 74—740 |

FOREIGN PATENTS 996,711  9/1951  France.

DON A. WAITE, *Primary Examiner.*

BROUGHTON G. DURHAM, *Examiner.*

K. DOOD, *Assistant Examiner.*